United States Patent
Herzberg et al.

(10) Patent No.: US 6,426,682 B1
(45) Date of Patent: Jul. 30, 2002

(54) TRANSCEIVER UNIT FOR A FIRST AND SECOND TRANSMITTING/RECEIVING FREQUENCY

(75) Inventors: Ralf Herzberg, Toenisvorst; Werner Kupka, Blaustein, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/890,785

(22) PCT Filed: Feb. 4, 2000

(86) PCT No.: PCT/DE00/00351

§ 371 (c)(1),
(2), (4) Date: Aug. 6, 2001

(87) PCT Pub. No.: WO00/46934

PCT Pub. Date: Aug. 10, 2000

(30) Foreign Application Priority Data

Feb. 4, 1999 (DE) ......................... 199 04 570

(51) Int. Cl.$^7$ ................................. H01P 1/10
(52) U.S. Cl. .................. 333/101; 333/100; 333/125; 333/126
(58) Field of Search ................. 333/100, 101, 333/125, 126, 128, 129, 134; 455/553, 121

(56) References Cited

U.S. PATENT DOCUMENTS

| | | | |
|---|---|---|---|
| 5,846,265 A | | 12/1998 | Ballance et al. |
| 5,986,520 A | * | 11/1999 | Aleno et al. ................. 333/134 |
| 6,091,966 A | * | 7/2000 | Meadows .................... 455/553 |

FOREIGN PATENT DOCUMENTS

EP   0 744 831 A2   11/1996

* cited by examiner

Primary Examiner—Michael Tokar
Assistant Examiner—Anh Q. Tran
(74) Attorney, Agent, or Firm—Morrison & Foerster LLP

(57) ABSTRACT

The invention relates to a transceiver unit for operation at a first and second transmitting/receiving frequency. In particular, a transceiver unit for operation in different systems of mobile telecommunication, having exactly one power output stage for the first and second transmitting frequency, one receiving section having a first and a second input for the first and second receiving frequency, respectively, a transmitting/receiving antenna and a switchable filter element for optionally connecting the power output stage or, respectively, the first or second input of the receiving section to the transmitting/receiving antenna.

15 Claims, 3 Drawing Sheets

TRANSCEIVER UNIT FOR A FIRST AND SECOND TRANSMITTING/RECEIVING FREQUENCY

CLAIM FOR PRIORITY

This application claims priority to International Application No. PCT/DE00/00351 which was published in the German language on Feb. 4, 2000.

TECHNICAL FIELD OF THE INVENTION

The invention relates to a transceiver unit, and in particular, to a transceiver unit for use in telecommunication systems having different transmitting/receiving frequencies.

BACKGROUND OF THE INVENTION

Transceiver units are known, for example, as dual-band terminals for use in mobile radio networks operated at different frequencies. This includes terminals which can operate both in a GSM mobile radio network operated at about 900 MHz and in a mobile radio network operated at about 1800 MHz—usually called a PCN network. Transceiver units can also be used in mobile telecommunication terminals which operate as terminals in a mobile radio network, especially in accordance with the GSM standard, and also as a mobile station in a DECT system in single-cell arrangement, i.e. as cordless home telephone or in a multi-cell arrangement, e.g. in a corporate network.

Dual-band terminals for the 900 MHz GSM band and the 1800 MHz PCN band are known which have two power output stages with a respective adapted harmonics filter which are connected to a common antenna depending on the required operating mode of the terminal. This solution is relatively expensive and associated with a high space requirement. If only one power output stage is used, the first harmonic partially falls into the PCN receiving band in GSM transmit mode. The strong attenuation by means of a suitable harmonics filter, required in GSM operation, has a disturbing effect in PCN mode so that the (GSM) harmonics filter must be switched off in PCN mode.

The usual dual-band receivers have separate inputs for GSM and PCN signals to achieve good selectivity characteristics. For this reason, the GSM or, respectively, PCN signal component must be separated from the total antenna signal. A special filter or switching unit is used for this purpose.

Finally, since transmitter output and receiver input act in conjunction with a single antenna, a transmitter/receiver switch (TX/RX switch) is needed which either connects the power output stage at its output, or the receiver input at its input, to the antenna. A RF-rated switch is used for this purpose.

SUMMARY OF THE INVENTION

In one embodiment of the invention, there is a transceiver unit for operation at least a first and second transmitting/receiving frequency, comprising: at least one power output stage, a receiving section having a first and a second input, at which it is tuned to the first and second transmitting/receiving frequency; and a transmitting/receiving antenna used for the first and second transmitting/receiving frequency, wherein a power output stage for the first and second transmitting frequency and a switchable filter element via which the power output stage and the first and second input of the receiving section can be connected to the transmitting/receiving antenna.

In one aspect of the invention, the filter element has separate taps for connection to the output of the power output stage and the first and second input of the receiving section, wherein an RF switch is provided between the first and second input of the receiving section and the corresponding taps of the filter element.

In another aspect of the invention, the filter element comprises a plurality of RF conductors or conductor sections, the respective electrical length, conductor track width and concatenation configuration for implementing predetermined attenuation characteristics are tuned to the first and second transmitting/receiving frequency.

In still another aspect of the invention, the filter element is formed from coherent conductor sections of a conductor train.

In yet another aspect of the invention, transmitting/receiving signals are processed having a first and second transmitting/receiving frequency, the second transmitting/receiving frequency being approximately twice the first transmitting/receiving frequency.

In another aspect of the invention, the filter element comprises a first, second, third, fourth and fifth node and a first, second, third, fourth and fifth RF conductor or conductor section, the first node being located at the output of the power output stage, the first conductor section having a first electrical length and extending between the first node and the second node, the second conductor section having a second electrical length and extending between the first node and a ground connection, the third conductor section having substantially the second electrical length and extending between the second node and the third node connected to the first input of the receiving section and ground, the fourth conductor section having substantially the first electrical length and extending between the second node and the fourth node which is associated with the transmitting/receiving antenna, and the fifth conductor section having substantially the second electrical length and extending between the fourth node and the fifth node connected to the second input of the receiving section and ground.

In yet another aspect of the invention, the end at the ground connection end of the second conductor section and the fourth and fifth node are associated with an RF ground switch.

In still another aspect of the invention, the first electrical length has a value of about $\lambda_{1/8}$ and the second electrical length has a value of about $\lambda_{1/4}$ referred to the wavelength $\lambda_1$ corresponding to the first transmitting/receiving frequency.

In one aspect of the invention, the transmission unit is a dual-band transceiver unit having a first transmitting/receiving frequency of about 900 MHz for a GSM mobile radio network and a second transmitting/receiving frequency of about 1800 MHz.

In another aspect of the invention, the RF conductors or conductor sections are constructed in stripline or microstrip technology.

In still another aspect of the invention, the RF switches are constructed as PIN diodes or GaAs FET switches.

In yet another aspect of the invention, the transceiver unit operates in a system having mobile telecommunication systems using different transmitting/receiving frequencies.

In another aspect of the invention, the filter element comprises a first, second, third, fourth and fifth node and a first, second, third, fourth and fifth RF conductor or conductor section, the first node being located at the output of the power output stage, the first conductor section having a first electrical length and extending between the first node and the second node, the second conductor section having a second electrical length and extending between the first node and a ground connection, the third conductor section having substantially the second electrical length and extending between the second node and the third node connected to the first input of the receiving section and ground, the fourth conductor section having substantially the first electrical length and extending between the second node and the fourth node which is associated with the transmitting/receiving antenna, and the fifth conductor section having substantially the second electrical length and extending between the fourth node and the fifth node connected to the second input of the receiving section and ground.

In still another aspect of the invention, the filter element comprises a first, second, third, fourth and fifth node and a first, second, third, fourth and fifth RF conductor or conductor section, the first node being located at the output of the power output stage, the first conductor section having a first electrical length and extending between the first node and the second node, the second conductor section having a second electrical length and extending between the first node and a ground connection, the third conductor section having substantially the second electrical length and extending between the second node and the third node connected to the first input of the receiving section and ground, the fourth conductor section having substantially the first electrical length and extending between the second node and the fourth node which is associated with the transmitting/receiving antenna, and the fifth conductor section having substantially the second electrical length and extending between the fourth node and the fifth node connected to the second input of the receiving section and ground.

In another aspect of the invention, the first electrical length has a value of about $\lambda_{1/8}$ and the second electrical length has a value of about $\lambda_{1/4}$ referred to the wavelength $\lambda_1$ corresponding to the first transrnitting/receiving frequency.

DETAILED DESCRIPTION OF THE INVENTION

The invention discloses a transceiver unit of the generic type having a simplified structure which can be easily and inexpensively produced.

The invention includes, for example, filtering-out of harmonics at a first transmit frequency, which can be switched off for operation at a second transmit frequency, in one functional unit which optionally connects the power output stage or one of the two receiver inputs to the antenna with appropriate attenuation of the antenna signal components which are not needed.

This is implemented in a switchable filter element which has separate taps for connecting the output of the power output stage and, respectively, the first and second input of the receiving section to the antenna.

In one embodiment, this filter element comprises a plurality of RF lines with an electrical length and a concatenation configuration between the taps which are tuned to the first and, respectively, second transmit/receive frequency. In another embodiment, these RF lines are constructed as conductor sections of a coherent conductor train which is formed by means of proven methods of microelectronics technology, especially in strip line or microstrip technology.

In a transceiver unit for use in a mobile part in one of the embodiments described, the multifunctional filter/switching element which forms the centerpiece of the invention, can be implemented in a convincingly simple manner considering that the second transmitting/receiving frequency is approximately twice the first transmitting/receiving frequency. The electrical lengths of RF line sections between certain taps, which generate a very low attenuation for the first transmitting/receiving frequency, have very high attenuation values for the second transmitting/receiving frequency. Conductor sections having an electrical length of $\lambda_{1/4}$ (where $\lambda_1$ is the wavelength corresponding to the first transmitting/receiving frequency, for example 900 MHz), have at the same time an electrical length of $\lambda_{2/2}$, where $\lambda_2$ is the wavelength corresponding to twice the first transmitting/receiving frequency, i.e. for example, 1800 MHz, as second transmitting/receiving frequency.

The switchable filter element comprises a number of RF switches which switchably connect the first and second input of the receiving section with associated taps of the filter element and, respectively, which are used at these taps and at the free end of a further conductor section for optionally establishing a ground connection. These RF switches are implemented as PIN diodes or GaAs FET switches in a conventional manner and can be advantageously produced together with the conductors or conductor sections of the filter element by utilizing a common process.

Figure 1:
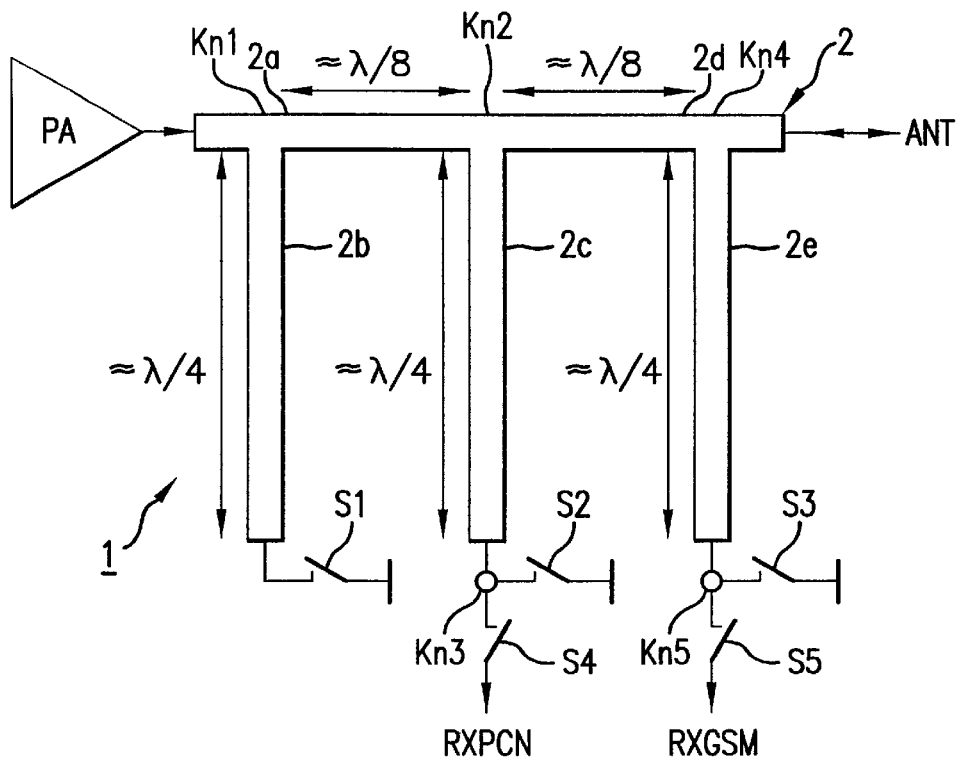
FIG. 1 shows a section of a transceiver unit according to a preferred embodiment of the invention.

FIG. 1 shows the section of the transceiver unit 1 of a dual-band mobile station. The transceiver unit, which is constructed for operation in a GSM mobile radio network at 900 MHz and for operation in a second mobile radio network at 1800 MHz, is referred herein to a PCN network. In transmit mode, a power output stage PA for both frequency ranges is connected to an antenna ANT via a filter element 2 constructed in microstrip or stripline technology. In receive mode, the antenna ANT is connected optionally via the filter element 2 to a first input RXGSM of a receive stage (not shown in the figure) or to a second input RXPCN of this receive stage. The filter element 2 comprises a first conductor section 2a having the electrical length of about λ/8 which extends between a first node Kn1 at the transmitter end and a second central node Kn2, a second conductor section 2b having a length of about λ/4 between the first node and a ground connection, a third conductor section 2c having a length of about λ/4 between the second node Kn2 and a third node Kn3 connected to the receiver input RXPCN, a fourth conductor section 2d of the approximate length λ/8 between the second node Kn2 and a fourth node Kn4 at the antenna end and a fifth conductor section 2c of a length of about λ/4 between the fourth node and a fifth node Kn5 associated with the receiver input RXGSM. This length information is related to the wavelengths corresponding to the GSM transmit/receive frequency band at about 900 MHz (more precisely: 875 . . . 915 MHz uplink, 920 . . . 960 MHz downlink). The conductor sections are formed coherently in uniform strip width in microstrip or stripline technology in the m-like configuration which can be seen in the figure.

At the end facing away from the power output stage of the second conductor section 2b, a first RF switch S1 is arranged, the third node Kn3 is connected to ground via a second RF switch S2, the fifth node Kn5 is connected to ground via a third RF switch S3, a fourth RF switch S4 is provided between the third node Kn3 and the receiver input RXPCN, and a fifth RF switch S5 is provided between the fifth node Kn5 and the receiver input RXGSM. The RF switches are constructed as GaAs FET switches or, as an alternative, as PIN diodes. The operating states of the transceiver unit specified in the first column are implemented by driving the switches in accordance with the table below. ("TXPCN" designates transmit mode in the PCN network at 1800 MHz, "TXGSM" designates transmit mode in the GSM network at 900 MHz, "RXPCN" designates receive mode in the PCN network and "RXGSM" designates receive mode in GSM mode.)

TABLE

|       | S1     | S2     | S3     | S4     | S5     |
|-------|--------|--------|--------|--------|--------|
| TXGSM | closed | closed | closed | open   | open   |
| TXPCN | open   | open   | open   | open   | open   |
| RXGSM | open   | closed | open   | open   | closed |
| RXPCN | closed | open   | open   | closed | open   |

The individual switching states of the transceiver 1 are shown in FIGS. 1A to 1D, the signal flow in each case being illustrated by a dashed line.

Figure 1A:
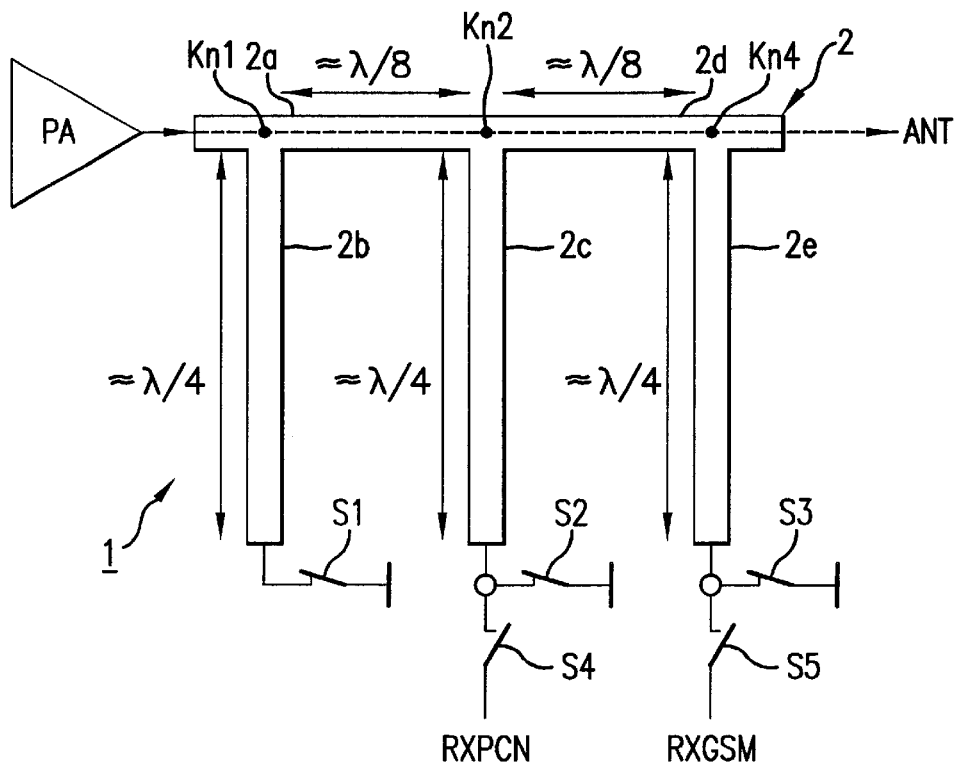
FIG. 1A shows the arrangement of FIG. 1 in a transmit mode at a first transmit frequency.

FIG. 1A shows the arrangement in GSM transmit mode. The first to third RF switches S1 to S3 are closed and short circuit the ends of the second, third and fifth conductor section 2b, 2c and 2c, respectively, and there is a direct signal link between the power output stage PA and the antenna ANT. The connections between the antenna ANT and the first and second receiver input RXPCN and RXGSM, respectively, in contrast, are broken since the switches S4 and S5 allocated to the receiver inputs are open. The electrical length of the conductor sections is approximately λ/4 for the findamental frequency. The short circuit at the lower end of the line is thus transformed into an open circuit at the top end, that is to say in nodes Kn1, Kn2 and Kn4. The signal path is the direct connection from the PA to the antenna. The open circuits in the nodes mentioned render the short circuited conductor sections invisible for the signal in the signal path. The signal can thus reach the antenna unimpeded. For the harmonic, that is to say a signal at 1800 MHz, the electrical length of the above mentioned conductor sections, however, is λ/2 and the short circuit at the "lower" end is again transformed into a short circuit in the above mentioned nodes. These short circuits in the signal path lead to a desired higher attenuation of the harmonic. Since there is more than one frequency (i.e., a whole frequency band analogous to the transmit band at GSM which is to be attenuated) the line lengths for lines 2b, 2c and 2e are selected to be different in practice, resulting in the required wide blocking range for the harmonics. Furthermore, the conductor length of 2a and 2d, and the widths of the lines, are also adapted in order to achieve the desired aim. Unwanted parasitic characteristics of the switching elements etc. which are not ideal are also compensated for by adapting the geometries. A circuit simulator can be used for solving the problem mathematically. As a result, the lengths of the conductor sections 2a and 2d, in particular, deviate considerably from the theoretical lengths, namely λ/8 at 900 MHz. In this arrangement, the filter element 2 acts as a harmonics filter for the GSM transmitter/receiving frequency of about 900 MHz which, in particular, suppresses the first harmonic at about 1800 MHz which would otherwise be radiated in or immediately adjacently to the PCN band in an interfering manner.

Since, however, it is not only one frequency but a whole frequency band analogous to the transmit band at GSM which is to be attenuated, the line lengths for lines 2b, 2c and 2e are selected to be different in practice, resulting in the required wide blocking range for the harmonics. Furthermore, the conductor length of 2a and 2d and the widths of all lines are also adapted in order to achieve the desired aim. It is a matter here of compensating also for unwanted parasitic characteristics of the switching elements etc. which are not ideal, by adapting the geometries. A circuit simulator is used for solving the problem mathematically. As a result, the lengths of the conductor sections 2a and 2d, in particular, deviate considerably from the theoretical lengths, namely λ/8 at 900 MHz. In this arrangement, the filter element 2 acts as harmonics filter for the GSM transmitter/receiving frequency of about 900 MHz which, in particular, suppresses the first harmonic at about 1800 MHz which would otherwise be radiated in or immediately adjacently to the PCN band in an interfering manner.

Figure 1B:
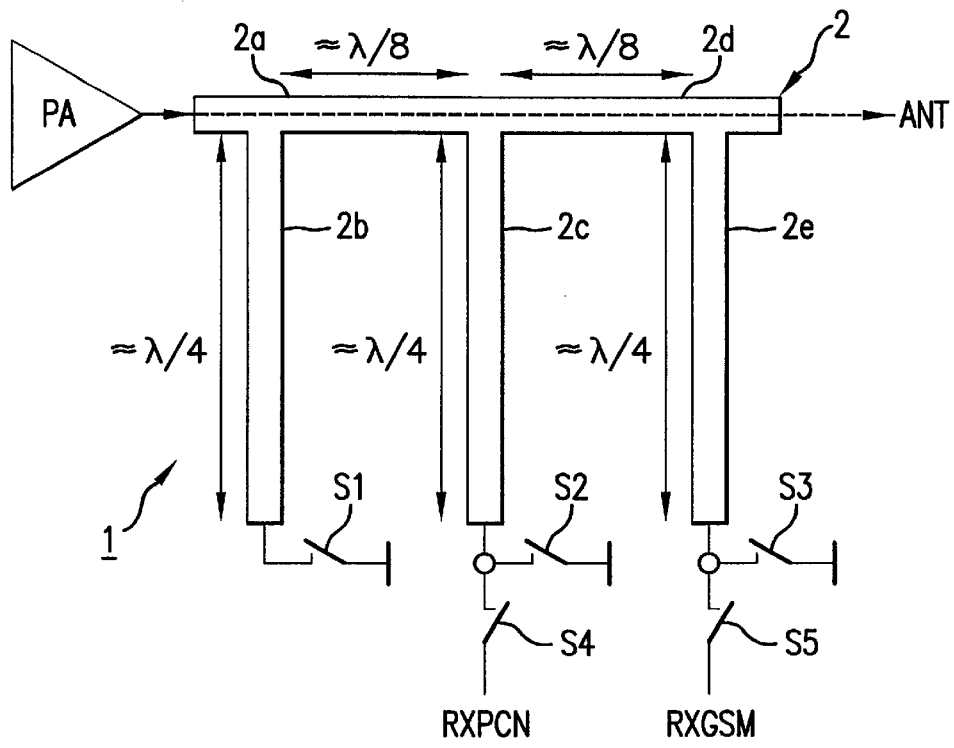
FIG. 1B shows the arrangement of FIG. 1 in a transmit mode at a second transmit frequency.

FIG. 1B shows the arrangement in the transmit mode in the PCN band, in which RF switches S1 to S5 are opened and thus ground and receiver connections are broken and one signal connection exists between the power output stage PA and the antenna ANT. In this arrangement, radiation occurs in the PCN band at 1800 MHz without exercising a filter effect for the PCN band.

Figure 1C:
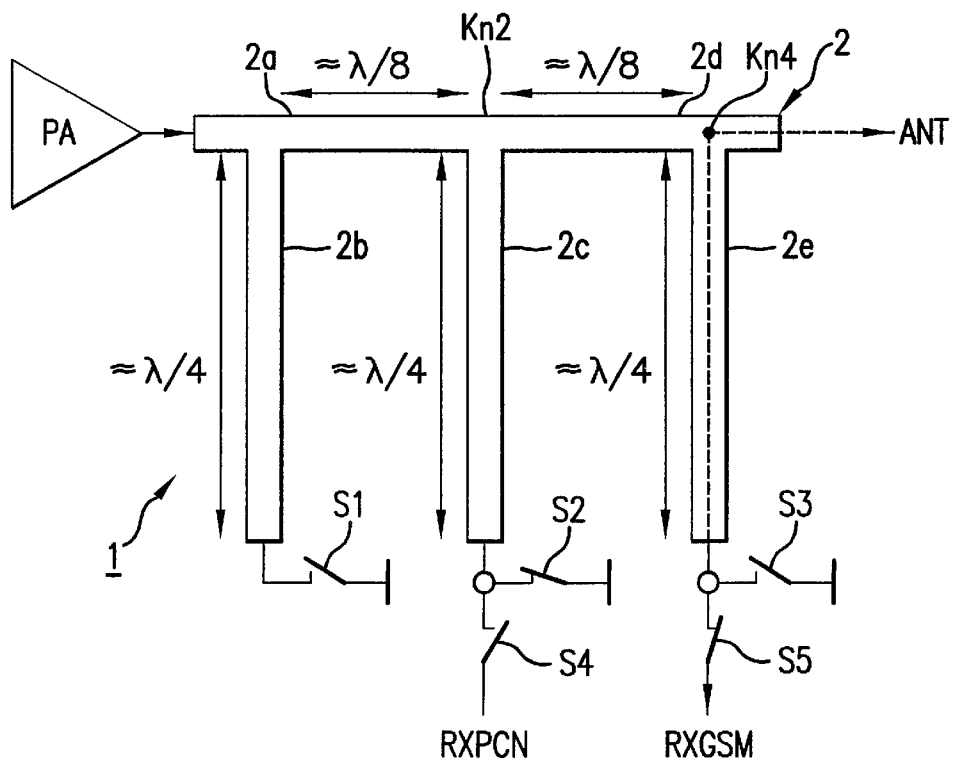
FIG. 1C shows the arrangement of FIG. 1 in a receive mode at a first receive frequency.

FIG. 1C shows the arrangement in GSM receive mode at 900 MHz in which the second RF switch S2 switches the end of the conductor section 2C at the receiver end to ground and the antenna is connected to the receiver input RXGSM via the fifth conductor section 2e and the switch S5, which is also closed. The remaining switches are open. In this switch position, the antenna signal components located in the GSM frequency band reach the GSM receiver input virtually unattenuated.

In the receiving case, the complex impedance of the transmitter (the PA) e is made invisible to the received signal, i.e. the transmitter is isolated from the receivers. This is achieved in the following way: in GSM receive mode, S1 is open. The open line 2b transforms the open circuit into a short circuit in the node Kn1. This short circuit short circuits the output impedance of the power output stage and thus makes it invisible for the received signal, as it were. The conductor sections 2a and 2d, however, result in λ/4 for GSM (900 MHz) and thus transform the short circuit in the node Kn1 into an open circuit in node Kn4, at least as far as the circuit to the left of node Kn4 is concerned. This part of the circuit thus no longer impairs the signal flow in the case of reception of GSM.

Figure 1D:
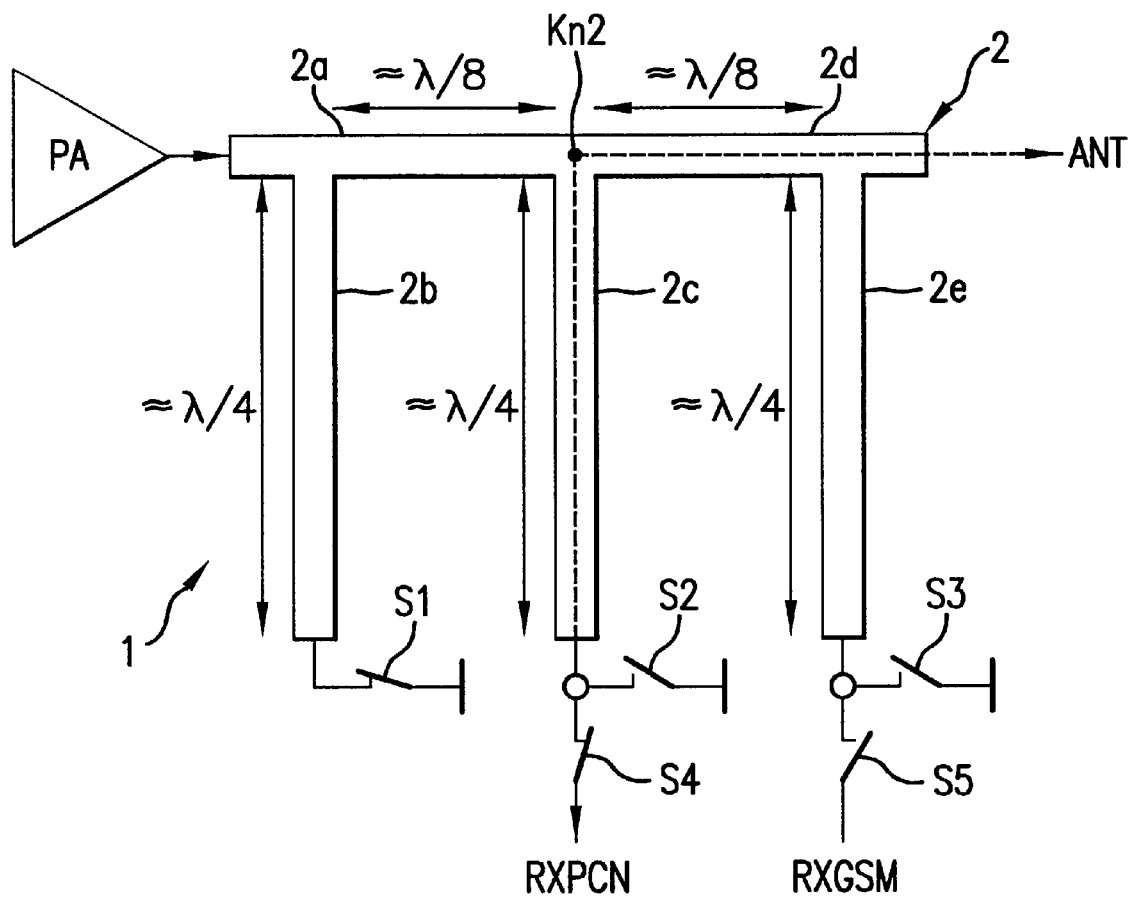
FIG. 1D shows the arrangement of FIG. 1 in a receive mode at a second receive frequency.

FIG. 1D shows the arrangement in the receive mode in the PCN band at 1800 MHz, the first switch S1 and the fourth switch S4 being closed and the three remaining switches being open. This establishes a direct connection between the antenna ANT and the receiver input RXPCN and, in parallel, a ground connection at the ground end of the conductor section 2b. The components of the antenna signal located in the GSM range around 900 MHz are greatly attenuated whereas the signal components located in the PCN band at 1800 MHz reach the receiver input RXPCN essentially unattenuated.

In principle, when PCN is being received, the PAs are isolated analogously to the GSM reception: in this case, S1 is closed and the short circuit is again transformed into a short circuit in the node Kn1 by the electrical length of λ/2 for PCN. Analogously to the GSM case, this short circuit is transformed into an open circuit in the node Kn2 by the line 2a, as far as the circuit to the left of node Kn2 is considered.

Since the transmit band for PCN is not precisely at twice the frequency of the transmit band for GSM, further corrections are required. Thus, reactive values (in the present case capacitors, but coils would also be conceivable in other frequency ratios) are provided to ground in the nodes Kn1 and Kn2 for compensation. In node Kn3, too, a compensation element may have to be provided.

As is clear from the above explanations, the preferred embodiment discloses a filter element formed from coherent conductor sections, to which two receiver input switches and three ground switches are allocated, carries out the functions of transmitter/receiver switching and of switching between the two receiver inputs and of attenuating the signal components which are not needed in the respective operating mode or are interfering. This results in considerable simplification compared with conventional configurations.

As is clear from the above explanations, the preferred embodiment is distinguished by the fact that a filter element formed from coherent conductor sections, to which two receiver input switches and three ground switches are allocated, carries out all functions of transmitter/receiver switching and of switching between the two receiver inputs and, finally, of attenuating the signal components which are not needed in the respective operating mode or are interfering. This results in considerable simplification compared with known configurations.

However, the implementation of the invention is not restricted to the embodiment described. Instead, it can also be applied in the context of other radio systems, for example in a combined GSM/DECT terminal or in other multi-band transmitting/receiving stations for mobile telecommunication. In particular, it is also possible in frequency bands other than the above mentioned frequency bands at 900 and 1800 MHz. The geometric configuration shown can also be modified as long as the implementation of the required attenuation values for the signal components to be filtered out is ensured.

What is claimed is:

1. A transceiver unit for operation at least a first and second transmitting/receiving frequency, comprising:
   at least one power output stage;
   a receiving section having a first and a second input, at which it is tuned to the first and second transmitting/receiving frequency; and
   a transmitting/receiving antenna used for the first and second transmitting/receiving frequency, wherein
   a power output stage for the first and second transmitting frequency and a switchable filter element via which the power output stage and the first and second input of the receiving section can be connected to the transmitting/receiving antenna.

2. The transceiver unit as claimed in claim 1, wherein the filter element has separate taps for connection to the output of the power output stage and the first and second input of the receiving section, wherein an RF switch is provided between the first and second input of the receiving section and the corresponding taps of the filter element.

3. The transceiver unit as claimed in claim 1, wherein the filter element comprises a plurality of RF conductors or conductor sections, the respective electrical length, conductor track width and concatenation configuration for implementing predetermined attenuation characteristics are tuned to the first and second transmitting/receiving frequency.

4. The transceiver unit as claimed in claim 3, wherein the filter element is formed from coherent conductor sections of a conductor train.

5. The transceiver unit as claimed in claim 1, transmitting/receiving signals are processed having a first and second transmitting/receiving frequency, the second transmitting/receiving frequency being approximately twice the first transmitting/receiving frequency.

6. The transceiver unit as claimed in claim 3, wherein the filter element comprises a first, second, third, fourth and fifth node and a first, second, third, fourth and fifth RF conductor or conductor section, the first node being located at the output of the power output stage, the first conductor section having a first electrical length and extending between the first node and the second node, the second conductor section having a second electrical length and extending between the first node and a ground connection, the third conductor section having substantially the second electrical length and extending between the second node and the third node connected to the first input of the receiving section and ground, the fourth conductor section having substantially the first electrical length and extending between the second node and the fourth node which is associated with the transmitting/receiving antenna, and the fifth conductor section having substantially the second electrical length and extending between the fourth node and the fifth node connected to the second input of the receiving section and ground.

7. The transceiver unit as claimed in claim 6, wherein the end at the ground connection end of the second conductor section and the fourth and fifth node are associated with an RF ground switch.

8. The transceiver unit as claimed in claim 6, wherein the first electrical length has a value of about $\lambda_{1/8}$ and the second electrical length has a value of about $\lambda_{1/8}$ referred to the wavelength $\lambda_1$ corresponding to the first transmitting/receiving frequency.

9. The transceiver unit as claimed in claim 7, the transmission unit is a dual-band transceiver unit having a first transmitting/receiving frequency of about 900 MHz for a GSM mobile radio network and a second transmitting/receiving frequency of about 1800 MHz.

10. The transceiver unit as claimed in claim 3, wherein the RF conductors or conductor sections are constructed in stripline or microstrip technology.

11. The transceiver unit as claimed in claim 5, wherein the RF switches are constructed as PIN diodes or GaAs FET switches.

12. The transceiver unit as claimed in claim 1, wherein the transceiver unit operates in a system having mobile telecommunication systems using different transmitting/receiving frequencies.

13. The transceiver unit as claimed in claim 4, wherein the filter element comprises a first, second, third, fourth and fifth node and a first, second, third, fourth and fifth RF conductor or conductor section, the first node being located at the output of the power output stage, the first conductor section having a first electrical length and extending between the first node and the second node, the second conductor section having a second electrical length and extending between the first node and a ground connection, the third conductor section having substantially the second electrical length and extending between the second node and the third node connected to the first input of the receiving section and ground, the fourth conductor section having substantially the first electrical length and extending between the second node and the fourth node which is associated with the transmitting/receiving antenna, and the fifth conductor section having substantially the second electrical length and extending between the fourth node and the fifth node connected to the second input of the receiving section and ground.

14. The transceiver unit as claimed in claim 5, wherein the filter element comprises a first, second, third, fourth and fifth node and a first, second, third, fourth and fifth RF conductor or conductor section, the first node being located at the output of the power output stage, the first conductor section having a first electrical length and extending between the first node and the second node, the second conductor section having a second electrical length and extending between the first node and a ground connection, the third conductor section having substantially the second electrical length and extending between the second node and the third node connected to the first input of the receiving section and ground, the fourth conductor section having substantially the first electrical length and extending between the second node and the fourth node which is associated with the transmitting/receiving antenna, and the fifth conductor section having substantially the second electrical length and extending between the fourth node and the fifth node connected to the second input of the receiving section and ground.

15. The transceiver unit as claimed in claim 7, wherein the first electrical length has a value of about $\lambda_{1/8}$ and the second electrical length has a value of about $\lambda_{1/4}$ referred to the wavelength $\lambda_1$ corresponding to the first transmitting/receiving frequency.

* * * * *